United States Patent [19]
Fukuda

[11] Patent Number: 5,864,114
[45] Date of Patent: Jan. 26, 1999

[54] COATING REMOVAL APPARATUS USING COORDINATE-CONTROLLED LASER BEAM

[75] Inventor: Tsutomu Fukuda, Kakogawa, Japan

[73] Assignee: Toshiharu Ishikawa, Hyogo, Japan

[21] Appl. No.: 549,705

[22] PCT Filed: Mar. 10, 1994

[86] PCT No.: PCT/JP94/00387

§ 371 Date: Nov. 10, 1995

§ 102(e) Date: Nov. 10, 1995

[87] PCT Pub. No.: WO95/24279

PCT Pub. Date: Sep. 14, 1995

[51] Int. Cl.$^6$ .................................................... B23K 26/04
[52] U.S. Cl. ............................ 219/121.83; 219/121.69; 219/121.8
[58] Field of Search ..................................... 427/554, 556; 219/121.83, 121.62, 121.68, 121.69, 121.8

[56] References Cited

U.S. PATENT DOCUMENTS

| 3,826,578 | 7/1974 | King et al. ........................... 219/121.8 |
| 4,756,765 | 7/1988 | Woodroffe ........................... 219/121.62 |
| 4,918,611 | 4/1990 | Shyu et al. .......................... 219/121.67 |
| 4,956,539 | 9/1990 | Uesugi et al. ....................... 219/121.8 |
| 4,986,664 | 1/1991 | Lovoi ................................... 219/121.62 |
| 5,109,149 | 4/1992 | Leung .................................. 219/121.8 |
| 5,171,963 | 12/1992 | Sarata et al. ....................... 219/121.83 |
| 5,204,517 | 4/1993 | Cates et al. ........................ 219/121.62 |
| 5,281,798 | 1/1994 | Hamm et al. ....................... 219/121.62 |

FOREIGN PATENT DOCUMENTS

| 3613096 | 10/1987 | Germany . |
| 4000754A1 | 7/1990 | Germany . |
| WO9312942 | 7/1993 | WIPO . |

Primary Examiner—Geoffrey S. Evans
Attorney, Agent, or Firm—Knobbe, Martens, Olson & Bear, LLP

[57] ABSTRACT

Removal of a coating, especially a thin coating such as a paint, formed on the surface of various structures, is conducted using a laser beam, based on coordinate data of an area being laser-fired and of a target area to be laser-fired. A projection spot of the laser beam partially and reciprocatingly rotates, and accurate control of removal is conducted in such a way as to match the area being laser-fired and the target area.

2 Claims, 5 Drawing Sheets

COATING REMOVAL APPARATUS USING COORDINATE-CONTROLLED LASER BEAM

FIELD OF THE INVENTION

The present invention relates to a coating removal apparatus for removing a coating such as a paint film or an oil film present on the surface of a structure such as a car.

PRIOR ART

Conventional techniques for removing a paint film present on the surface of an object include mechanical scraping, chemical dissolution or the like. However, of these techniques, the former one has the disadvantages of generating dusts to be processed later, involving the risk of damaging the object's surface or the like. The latter technique does not generate dusts, but has the disadvantages such as flammability of a solvent used, toxicity of the solvent, processing for the disposition of the solution with a paint composition dissolved.

As another attempt, there have been proposed techniques for removing a paint film by firing laser beams so as to heat and vaporize the film. For example, U.S. Pat. No. 4,588,885 discloses an apparatus which senses the removal of a paint film by analyzing the spectrum of the reflected light from the laser-irradiated area and repeats removing operations until a complete removal is achieved. However, this apparatus does not contemplate the automation of removal operations, so it is not suited for removing paint films on up-and-down surfaces or on complicated structures.

U.S. Pat. No. 4,986,664 discloses a method for firing laser beams to remove a material stuck on a surface of a structure, for example, seam fillers for an aircraft's body, when finishing the material to a desired shape. This method comprises the steps of preparing a three dimensional map of a structure; preparing data representative of a desired profile with a material coated in an ideal thickness; coating the material a little thicker; scanning the coated surface to prepare data representative of the coated surface; firing necessary positions in accordance with the map while comparing the data representative of the desired surface contour to that representative of the coated surface; comparing the data representative of the removed surface profile to that representative of the desired profile; and repeating the removing operations until an appropriate removal is achieved. This method was certainly effective in the case where the material is coated so thick that the data representative of the coated surface profile can be discriminated from that of the uncoated surface profile, but was not suitable for removing a thin film such as a paint, an oil film etc. which contour can not be detected as distinguishable data. Furthermore, the control for firing necessary positions was performed only in accordance with the map data of the painted surface. Accordingly, due to the variations of structure contours, errors in installing the apparatus or the like, the position actually being laser-fired was shifted from the position specified in the control data, and therefore this method had difficulties in performing precise removal operations.

PROBLEMS TO BE SOLVED BY THE INVENTION

It is therefore an object of the present invention to provide a coating removal apparatus for a structure which can automatically remove a thin film such as a paint film or an oil film on the surface of the structure.

MEANS FOR SOLVING THE PROBLEMS

The above object is achieved by a coating removal apparatus for removing a coating present on the surface of a structure using a laser beam, the apparatus comprising:

a control device for controlling laser beam projections and coating removal operations;

a laser for firing a laser beam to the surface of the structure in accordance with a laser beam firing signal forwarded from the control device;

a scanning device for scanning the laser beam from the laser over the structure based on an operating signal forwarded from the control device; and a monitoring device for monitoring the removal progress of the coating and generating data related to the removal progress, wherein the control device comprises a setting device for entering coordinate data of each area on the structure surface and laser firing specifications at each coordinate position, a scanning controller for generating an operating signal for the scanning device based on the coordinate data in the setting device, and a emitting controller for generating a laser beam firing signal in synchronism with the scanning of a laser beam based on the laser beam firing specifications in the setting device.

OPERATIONS AND ADVANTAGES

According to the present invention, a coating on a structure surface is vaporized and removed by firing laser beams emitted from a laser. The firings of laser beams is controlled by a control device comprising a setting device to which coordinate data at each position on the structure surface and laser-firing specifications for each coordinate position are entered; a scanning controller generating an operating signal of the scanning controller based on the coordinate data stored in the setting device; and a firing controller generating a laser beam firing signal based on the laser beam firing specifications stored in the setting device, thereby performing removal operations automatically on various structures. Further, the removal progress is monitored by a monitoring device, thereby repeating removal operations if necessary until the complete removal is achieved.

According to a preferred embodiment of the present invention, the scanning controller of the control device has a contour recognition device which notes and recognizes the contour of the area around a position to be laser-fired, the setting device is adapted to be entered with three-dimensional data including the data representative of the up-and-down contour of a structure, the scanning controller moves a laser head to a target coordinate position in accordance with the coordinate data, prepares contour data representative of the area around the target position, compares the prepared contour data to the actual contour data of the area around the position to be laser-fired which is recognized by the contour recognition device so as to detect any shifts between them, and adjusts a laser-firing position by matching the two contours.

Thus, utilizing an up-and-down contour, an actual firing position on the structure is decided based on the up-and-down contour so as to correct a scanning position in the coordinate data, thereby realizing a precise laser firing. Accordingly, in spite of the contour variations of structures or errors in installing the structure and/or moving the laser head, it is possible to perform precise coating removal operations and to thereby advantageously apply the present invention on a large structure and a complicated structure.

The monitoring device may have a color sensor which can note color changes on the structure surface before and after being laser-fired so as to determine whether there are any unremoved areas. The monitoring device also may have a distance sensor which can note a change of the distance between the distance sensor and the structure surface before and after being laser-fired so as to determine whether there are any unremoved areas.

The provision of these sensors to find unremoved areas facilitate the automation of coating removal operations.

The present invention will be better understood by several embodiments which will be described hereinafter with reference to the accompanying drawings.

EMBODIMENTS

Figure 1:
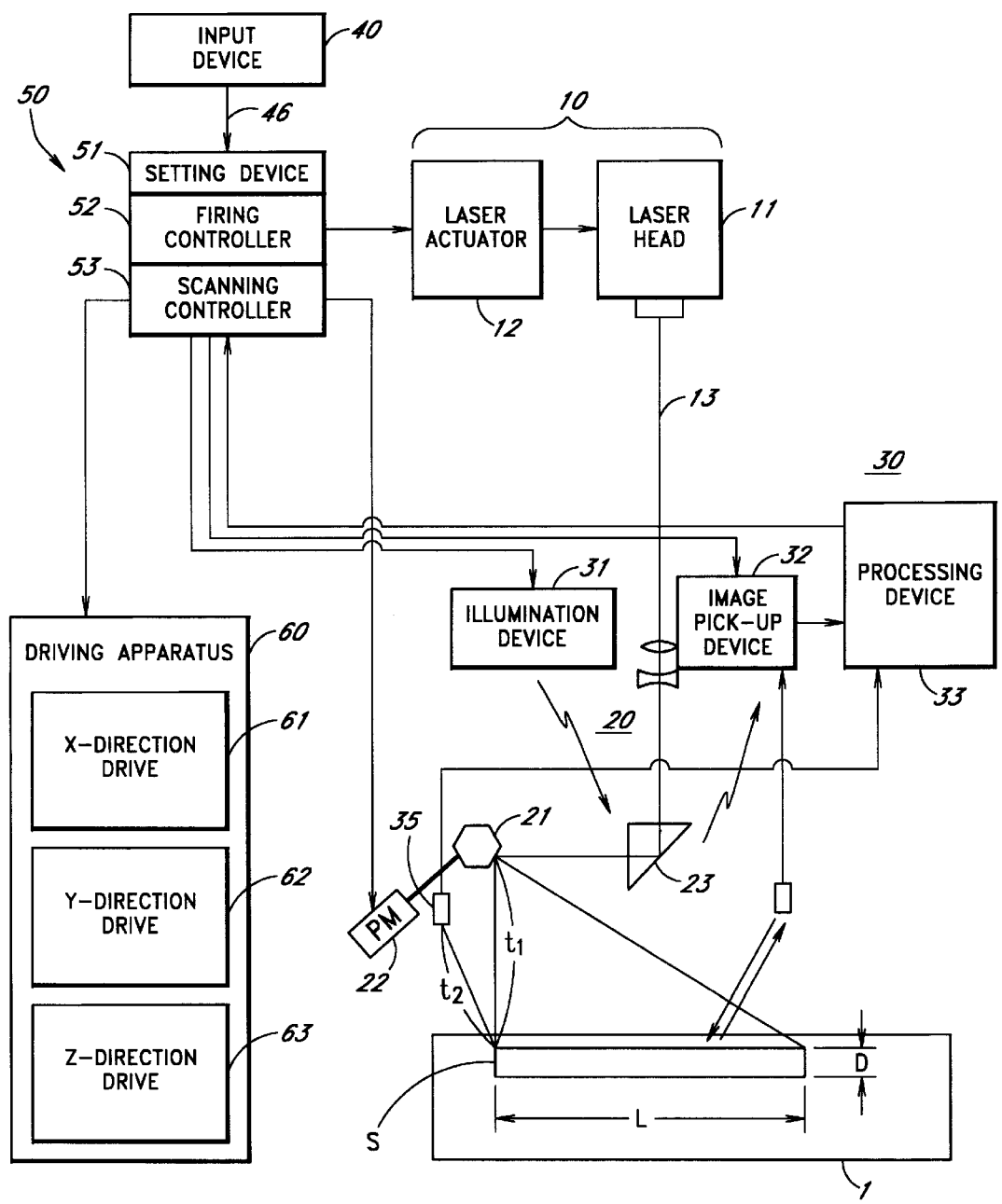
FIG. 1 is a block diagram illustrating an embodiment of the coating removal apparatus according to the present invention.

FIG. 1 shows a schematic view of one embodiment of the coating removal apparatus according to the present invention.

The present embodiment is constructed to perform a coating removal for necessary areas of the entire surface of a target structure 1 by setting a unit region S within which a laser beam is reciprocally moved to remove the coating, wherein the coating removal is performed per each unit region S, and wherein the unit region S is sequentially moved on the structure surface. For this purpose, the coating removal apparatus of the present embodiment comprises a laser 10 for emitting a laser beam 13; an optical system 20 for reciprocally moving a laser beam 13 emitted from the laser 10 within the unit region S on the structure 1; a monitoring device 30 for monitoring the coating removal progress; an input device 40 for entering removal specifications such as laser beam intensities and removal procedures and coordinate data representative of the contour of the structure 1; a control device 50 which stores the removal specifications entered from the input device 40 in a setting device 51 and generates operating signals for the laser 10 and the optical system 20 according to the entered removal procedures and in accordance with the contour of the target, the control device 50 outputting instructions to move the unit region S based on the information from the monitoring device 30; and a feed device 60 for shifting the laser 10 and the optical system 20 relative to the structure 1 so that the unit region S is sequentially moved over the surface of the structure 1 in accordance with the instructions from the control device 50. In this example, the optical system 20 and the feed device 60 constitute a scanning device for scanning a laser beam over the structure, and the control device 50 includes the setting device 40; a scanning controller 52 for generating an operating signal for the scanning device and a firing controller 53 for generating a firing signal for the laser.

The laser 10 has a laser head 11 for projecting a laser beam and a laser actuator 12 for actuating the laser head 11. The laser head 11 may preferably be a gas laser having a large output, but it is not limited thereto. The laser actuator 12 is controlled by the control device 50 so that the laser head be actuated to project a desired output. The output power of a laser beam, if a target coating is a paint film, is required to have an energy of 10–50 J/cm$^2$, for example, to vaporize the paint film completely. If such an large energy is fired at one time, there occur the following problems that a structure substrate, on which a coating is formed, is heated and then damaged, a high power laser head is necessitated, the control of coating removal operations is difficult and the like. Accordingly, in the present embodiment, the head 11 is adjusted to project an energy of about 5 J/cm$^2$ to a target region. The degree of an energy to be fired is also determined in relation to the reciprocatory speed of the optical device 20 which is later described. A laser beam from the laser head may be emitted in the form of a pulsed output or a continuous output, but the pulsed output is more advantageous since a precise control can be made by adjusting the pulse frequency, the pulse width, the pulse energy or the like according to the conditions such as thickness of a coating and types of the coating.

The optical system 20 has a polygon mirror 21, a pulse motor 22 for rotating the polygon mirror 21, a prism 23 serving to be an orienting element for introducing a laser beam emitted from the laser head 11 to the polygon mirror 21. The pulse motor 22 may be, for example, a stepping motor. Of course, any other types of motors than the pulse motor may be used for rotating the polygon mirror 21 so long as it functions similarly.

The rotation of the pulse motor 21 is controlled by the scanning controller 52 of the control device 50. This rotation control is conducted by determining the length of a stationary time in consideration of the amount of an energy to be irradiated at one time. That is, if the output of a laser beam is constant, the longer the stationary time, the greater the projected energy. In the case of a continuous output, the stationary time is proportional to the projected energy, and in the case of a pulsed output, the number of output pulses during the stationary time is proportional to the projected energy.

The rotational angle of the polygon mirror is determined such that when a projection spot formed by a laser beam on the structure surface is moved to adjacent positions sequentially, the structure surface is uniformly fired with few positions double-fired. The effective projection spot is 1 cm in diameter in this embodiment. Of course, the present invention is not limited thereto. It is also possible to use other shapes for the projection spot, such as a rectangular shape, for example, square or rectangle, a slit shape or the like.

The monitoring device 30 comprises an illumination device 31 for illuminating the surface of the structure 1, an image pick-up device 32 for picking up the image of the surface of the structure 1, a processing device 33 for processing image signals from the image pick-up device 32 so as to monitor the removal progress of a target. As the illumination device 31, it is possible to use a high intensity illumination device of 500 W and 5,000 K (candela) for high vision use. This illumination device 31 preferably has such an illuminating range that at least the unit region S on the structure 1 may be illuminated. The image pick-up device 32 may be, for example, a high-vision color television camera having about 1,000 scanning lines and about 1,780,000 pixels. The processing device 33 calculates color distribution from the signals representative of R (red), G (green) or B (blue) for the respective pixels and compares the calculated result to the color distribution on the image data picked-up before the removal process so as to determine whether or not the coating is removed. When it is determined that the overall coating is completely removed, the processing portion 33 outputs a removal termination signal. This removal termination signal is forwarded to the control device 50.

Figure 2:
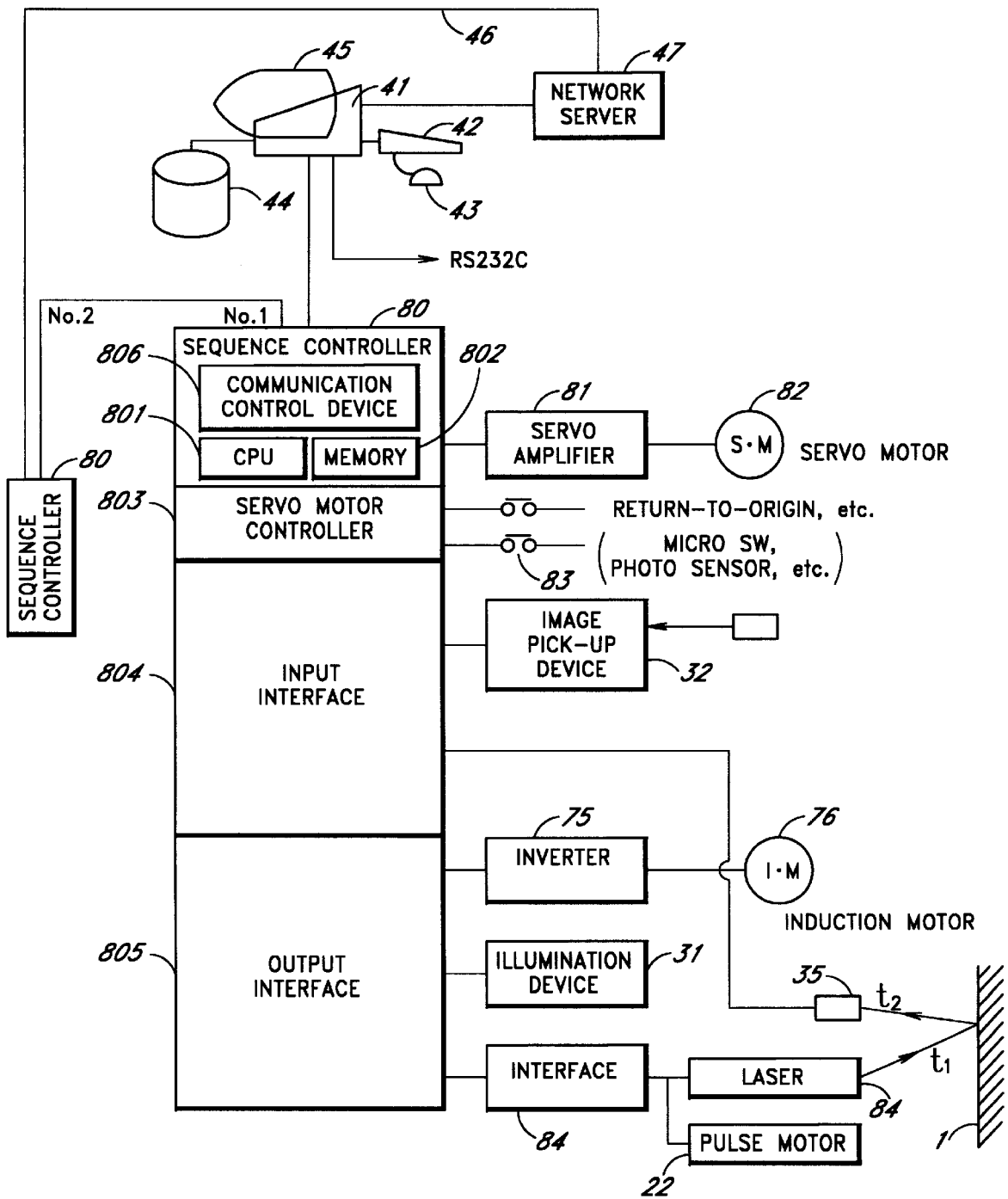
FIG. 2 a block diagram schematically illustrating a control system of the embodiment of FIG. 1.

The input device 40 is constituted by, for example, a compact computer as shown in FIG. 2 later mentioned. The input device 40 is used to enter the contour data of the structure 1, the information about a target such as coating removal positions, various control parameters such as coating removal speed and store these data therein. The various control parameters are used, for example, to adjust the amount of the laser beam output fired on the structure surface per unit time. The input device 40 is connected to the setting device 51 via a local area network (LAN) 46, entering various instructions such as operating sequence programs to the control device 50 and monitoring the operation of the control device 50.

Following the pre-set procedures (program), the control device 50 controls the operations of the laser 10 and the optical system 20 according to the conditions preset by the above input device 40 and the contour of a target so as to adjust the output of a laser beam projected on the structure surface per unit region. The control device 50 also and outputs instructions to move the unit region S based on the information from the monitoring device 30. For this purpose, the control device 50 forwards various control signals representative of a pulse width of one pulsed laser beam, an emission frequency and a emission timing of the beam to the laser actuator 12, based on the target information entered from the input device 40 and on various control parameters and in accordance with a preset program. In synchronism with the forwarding, the control device 50 also forwards various control signals such as a signal to control the pulse motor 22 and a drive timing signal to the pulse motor 22. Further, to the illumination device 31 and the image pick-up device 32 are forwarded instructions for illuminating and picking up the image of the target. Furthermore, each time a coating removal for one unit region S is finished, to the feed device 60 is forwarded an feed instruction signal.

The feed device 60 comprises an X-direction drive 61 and a Y-direction drive 62 for two-dimensionally moving the unit region S over the surface (referred to as X-Y surface) of the structure 1 and a Z-direction drive 63 for moving the laser radiator in a Z direction so as to maintain the distance constant between the surface and the laser head. These drives have a power source such as a motor and a power transmission system for transmitting the power of the motor, which are not illustrated in the drawings.

Figure 3:
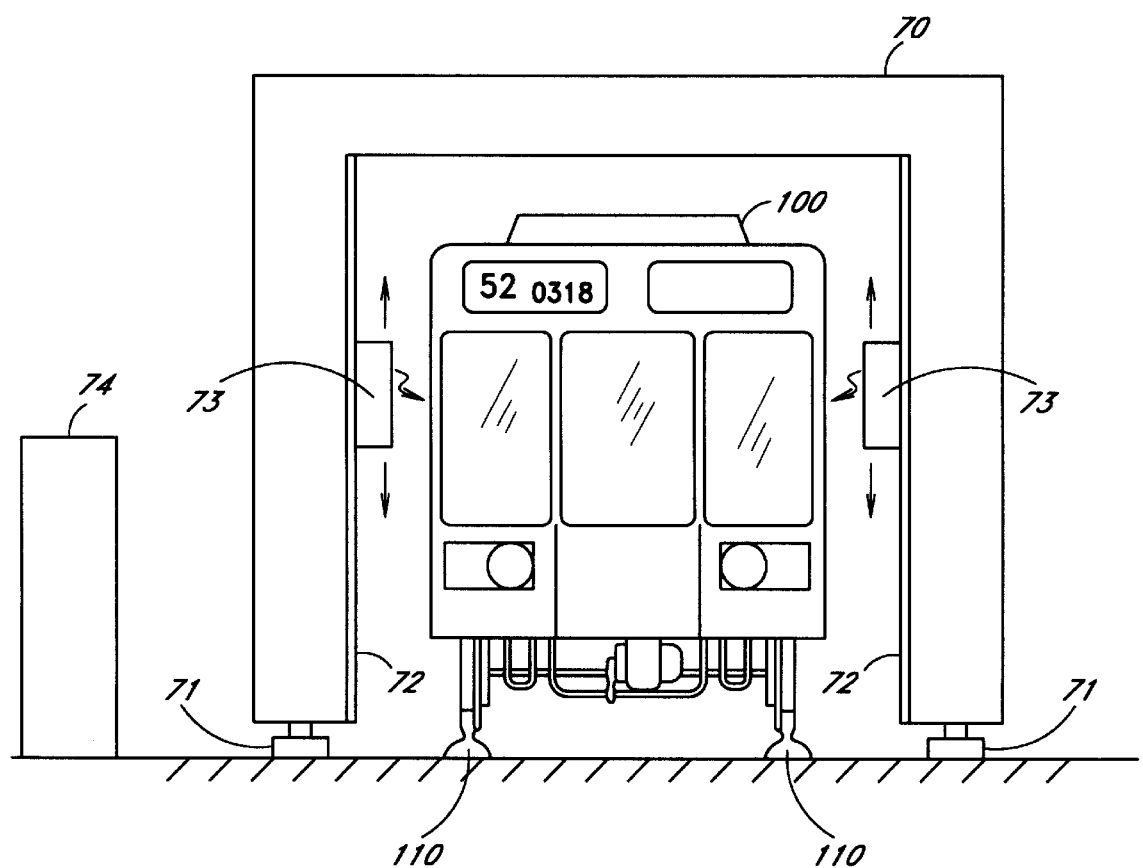
FIG. 3 is a front elevation illustrating an embodiment in which the invention apparatus is used for removing a coating on a car.

Next, an application of the invention will be described concretely. The present embodiment is applied to remove the coating on a car 100 or the like as shown in FIG. 3. FIG. 3 illustrates an example having a mobile gate 70 surrounding the car 100 on a pair of rails 110, a pair of horizontal rails 71 supporting the mobile gate 70 movably in the direction along the rails 110, vertical rails 72 vertically (referred to as Y-direction) mounted on the mobile gate 70, coating removal heads 73, 73 which engages with the vertical rails 72 and moves along the rails 72 and a controller 74.

The mobile gate 70 is provided with a gate drive (not shown in FIG. 3) for enabling the gate to self-advance along the rails 71. This gate drive has an invertor 75, an induction motor 76 driven by the invertor and an unillustrated power transmission mechanism as shown in FIG. 2 later described.

The coating removal heads 73 are provided oppositely to each other with the car 100 being disposed therebetween. This coating removal head 73 is provided with the laser 10, the optical system 20, the monitoring device 30, the control device 50, the X-direction drive 61, the Y-direction drive 62 and the Z-direction drive 63 shown in FIG. 1. Of the feed devices 60 shown in FIG. 1, the X-direction drive 61 moves the unit region S along the longitudinal direction (referred to as X-direction) of the car. The Y-direction drive moves the coating removal heads 73 along the rails 72. The Y-direction drive may serve to vary the distances from at least the laser head 11, the illumination device 31 and the image pick-up device 32 to the car 100. The X-direction drive 61, the Y-direction drive and the Z-direction drive 63 respectively include servo motors 82 as a driving source and a servo amplifier 81 for actuating the servo motors.

The controller 74 carries the input device 40. This controller 74 is installed separate from the mobile gate 70, but is connected to the mobile gate 70 via a LAN 46 (see FIG. 2). Of course, the controller 74 may be directly mounted on the mobile gate 70. Further, it is also possible to mount other components such as the control device 50 on the controller 74. Furthermore, the controller 74 and the coating removal heads 73 may be directly connected via a signal line, an optical fiber cable, a radio transmission means or the like instead of the LAN.

Next, the construction of the controlling system used for the present embodiment will be described. The apparatus of this embodiment is constituted by using a controlling computer system as shown in FIG. 2.

The controlling system of the present embodiment includes a sequence controller 80 provided at each coating removal head 73, the above input device 40 commonly used for the sequence controllers, the LAN 46 and a network server 47 for supervising the LAN.

The LAN 46 is constructed to use, for example, an optical fiber cable as a transmission medium. The LAN 46 is connected to the input device 40, the sequence controller 80 and the network server in a ring-like manner. In the present embodiment, two sequence controllers 80, 80 are connected, but a necessary number of the sequence controllers 80, for example, the number corresponding to that of the lasers 10 may be provided.

The input device 40 includes, for example, a main body 41, a keyboard 42, a mouse 43, a disk drive 44 and a display 45. The main body 41 is constituted by a central processing unit, a primary memory, a communication device, an interface and the like (not shown). The disk drive 44 may be an optical disk device, a magnetic disk device or the like. In this embodiment, an externally equipped type disk drive is shown, but an internally equipped type in the main body 41 may also be used.

The sequence controller 80 are provided with a central processing unit (CPU) 801 for conducting a sequence controlled operation, and a memory 802 for storing a sequence program, various preset conditions, contour data and the like. A servo amplifier 81 is connected to a controller 803 which controls the operation of the servo motor 82. Further, to an input interface 804 are connected a group of limit switches 83 such as a return-to-origin switch, various micro switches and a photo switch, an image pick-up device and the like. To the switch group 83 are connected an interface 84 connected with the pulse motor 22, the structure 10 and the like.

Figure 4:
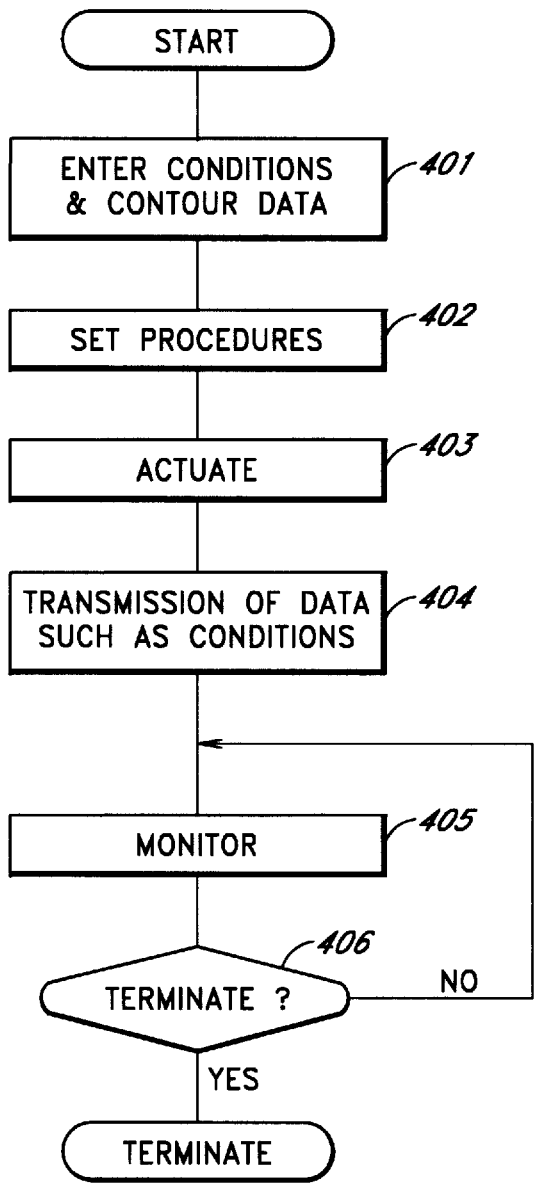
FIG. 4 is a flow chart illustrating one example of the process and procedures of the setting device in the invention apparatus.

The sequence controller 80 serves to function as the above-mentioned processing device 33 and the control device 50. More specifically, the sequence controller 80 has its operating program pre-stored in the memory 802. This operating program includes a program for carrying out the processing procedures shown in FIGS. 4 and 5 which are later-described, a program for making calculations to determine a laser firing time or the like from various conditions and the like. The sequence controller 80 is connected to the communication control device 806 via the LAN 46.

Next, the operation of the present embodiment will be described. First, the operation of the input device 40 will be described with reference to FIG. 4. Into the input device 40, the contour data of a target, i.e., the car 100 and removal conditions are entered (Step 401). These data may be design data if any. Specifically, in the case where a target is designed by a computer, its design data (digital data) can preferably be used. The data may be entered through a communication means and/or the disc driving device 44. Of course, these data can also be entered through a keyboard. Also, various conditions for conducting a coating removal such as required time are entered.

Next, the coating removal procedures are programmed (Step 402). This programming can be conducted by an operator via the keyboard 42. Removal conditions such as the size of a unit region, the scanning length L and scanning width D of a laser beam are programmed. The length L is set at an appropriate value in the range of 30–100 cm, for example. The width D is set at 1 cm, for example. The removal procedures may be pre-programmed automatically from the conditions, the contour data and the like. When the conditions, the contour data, the removal procedures and the like are entered, these data are stored in a recording medium, for example, a magnetic disk in the disk drive 44.

Next, the input device 40 receives a start-up command from the operator and then forwards this command to the respective sequence controllers 80 via the LAN 46 (Step 403). Further, these data is also forwarded to the corresponding sequence controllers 80 via the LAN 46 (Step 404). Various signals forwarded from the respective sequence controllers 80 via the LAN 46 are monitored (Step 405). It is determined whether or not the forwarded signals are termination signals. If they are not termination signals, the monitoring is continued. If termination signals, a series of the procedures are terminated (Step 406).

Figure 5:
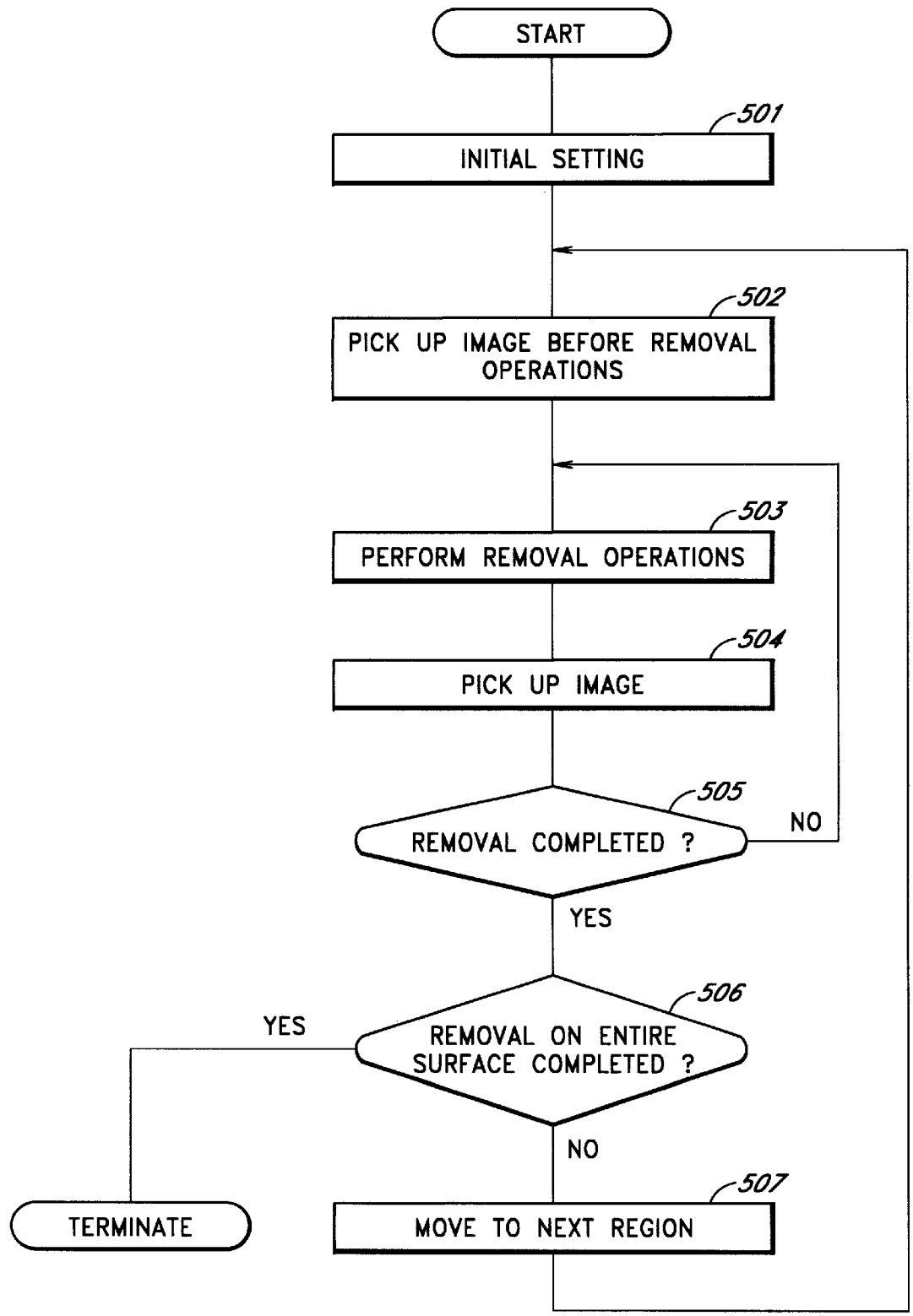
FIG. 5 is a flow chart illustrating another example of the process and procedures of the setting device in the invention apparatus.

Next, the operations of the respective sequence controllers will be described with reference to FIG. 5. When the sequence controller 80 receives a start-up command and also transmitted data such as removal conditions, it stores these data in the memory 802. Then, the sequence controller 80 is set in accordance with initial setting conditions (501). As the initial setting conditions, the pulse width, the pulse interval of a laser beam projected from the laser head 11, the rotational manner of the pulse motor 22 such as the length of a stationary time and the size of the unit region S are entered and calculated. Further, the initial setting also includes setting the coating removal heads 73 to an initial position (home position) and the like. Then, the coating removal operations are initiated in accordance with the programmed procedures.

First, an image of the unit region S just to be removed is picked up before being removed (Step 502). More specifically, that region is illuminated by the illumination device 31, and then its image is picked up by the image pick-up device 32. The image pick-up device 32 outputs obtained image data as digital signals which the CPU 801 in turn stores in the memory 802.

The respective sequence controllers 80 receive the image signals forwarded from the image pick-up device 32 and stores them in the memory 802. Then, the laser 10 and the pulse motor 22 are actuated via the interface 84 to initiate the coating removal operations. More specifically, a laser-beam is fired per each unit region. In the firing, the pulse motor 22 is rotated stepwise at a pre-set time interval for the laser 10 to scan the unit region S with a laser beam so as to fire necessary positions sequentially along the longitudinal direction of the unit region S. Thus, the coating within the unit region is vaporized and removed. It is decided by the monitoring results described later whether the coating removal is conducted by one scanning operation or plural scanning operations. In addition, the number of scanning operations may be pre-fixed as one of the removal conditions.

When the first scanning is finished for one unit region S, the CPU 801 orders the image-pickup device 32 to take an image of the just scanned unit region S so as to obtain the image signals thereof (Step 504). Then, the obtained image signals are compared to the image data stored in the memory 802. If the comparison shows that the coating on the unit region S is completely removed, it is determined that the removing operations be terminated, but if not removed, the above steps starting with Step 503 are repeated for the unit region S (Step 505). Here, the determination whether or not the coating is further removed is conducted by comparing the proportions of R, G and B signals of a picture element. For example, if the coating is yellow before the removal operations, the proportions of R, G and B signals corresponds to yellow. During the removal operations, the signal proportion of the pixel changes into another signal proportion indicating non-yellow color. When no signal proportion to indicate yellow is detected for all picture elements, it can be determined that yellow coatings are removed. It is also possible to obtain the average of all signals representative of the overall color of the region S or the variance of those signals and compare them without comparing the signal proportion for each picture element.

When a series of coating removal operations are finished, the CPU 801 determines whether or not the coating to be removed has been removed from the entire surface of the car 100 (Step 506). If the coating is completely removed, all the operations are terminated. On the other hand, if not, the CPU 801 instructs the feed device 60 to move the unit region S to a preset adjacent position in accordance with the pre-set procedures (Step 507). The feed device 60 is moved, for example, to a next position in the Y-direction. In the case of moving the feed device 60 in the X-direction, since the feed device 60 can be moved only within the width of the mobile gate 70, it cannot cover longer a distance in the X-direction. In such a case, the CPU 801 actuates the inductor motor 76 via the invertor 75 to move the mobile gate 70 by a necessary distance in a desired direction.

Thus, it is possible to remove the paint film on the car 100. It is also noted that the laser head can be moved in the Z direction with reference to the contour data. It is also possible to provide a distance sensor and perform a Z-direction control with detected results.

In the above embodiment, two coating removal heads 73 are used to perform removal operations on both side faces of the car 100, simultaneously. However, the present invention is not limited thereto. Specifically, it is possible to use more of the coating removal heads for performing removal operations.

Further, though the above embodiment shows an example wherein coating removal heads are provided on a gate, the coating removal heads may be provided on other operating components. For example, they can be mounted on a articulated robot arm.

Further, in the above embodiment, the target car is fixed for removal operations. However, it is also possible that only a target structure or both the invention apparatus and the structure may be moved for the removal operations.

In the above embodiment, the processing device 33 performs color comparison of the target to determine whether the coating is removed, but the present invention is not limited thereto. For example, the monitoring device may include means for illuminating the unit region on the structure and receives the reflected light from the unit region for spectrum analysis and means for determining whether to continue or terminate firing laser beams to that region according to the results of the analysis. In this case, it is possible to use a CCD camera as a device for receiving the reflected light. Further, it is also possible to determine whether to continue or terminate laser firings by entering into a computer the spectrum-analyzed results of the color on the structure surface before the coating removal operations and comparing the entered results to the spectrum-analyzed results of the light received by a CCD camera. Further, the determination can also be conducted by detecting the change of the distance to the structure surface. This process is done by utilizing the fact that the distance to the structure surface is increased by the thickness of the removed coating after the coating removal operations, the distance being measured by measuring the change of time within which a laser beam reflects and returns. Alternatively, it is possible to measure the distance change by utilizing a distance sensor mounted on the sensor head 34 and emitting a distance measuring light to a coating-removed area. As the removal operations progress, the distance sensor is moved to determine the removal progress on respective positions.

The scanning controller 53 of the control device 50 may have a contour recognition device which detects the contour of a structure. The contour recognition device detects the contour of the area around the position being just fired. On the other hand, the input device 40 is entered with three-dimensional coordinate data including the contour data representative of the up-and-down contour of the structure. The scanning controller 53 moves the laser head to a target coordinate position to be fired in accordance with the coordinate data. Further, the scanning controller 53 retrieves the contour of the area around the target position in accordance with the said coordinate data and compare it to the contour of the area around a position to be actually laser-fired. This comparison enables it to detect the shift between the target position and the position to be actually fired. This shift is generated primarily by production errors, although all structures of the same type being produced as being identical theoretically, errors in setting the structure to repeatedly fire and/or in moving the laser head. The scanning controller 53 adjusts a laser firing position in order to match the two contours, whereby the shift is eliminated, and an adequate position on the structure is laser-fired.

The present invention is not limited to the above embodiments and modifications can be made without departing from the technical scope defined by the claims.

What is claimed is:

1. A coating removal apparatus for removing a coating present on the surface of a structure, using a laser beam, the apparatus comprising:

a control device for controlling laser beam projections and coating removal operations, comprising:

a setting device for entering coordinate data of the structure surface and laser firing specifications at each coordinate position, said setting device being provided with three-dimensional coordinate data including data representative of up-and-down contour of the structure;

a scanning controller for generating an operating signal, based on the coordinate data in the setting device and on the removal progress of the coating, said scanning controller having a contour recognition device for detecting and recognizing a first contour of an area around a position to be laser-fired, wherein the scanning controller is constructed to direct a laser beam to a target position based on the coordinate data, retrieve a second contour from said coordinate data of an area around the target position, determine whether there are any positional deviations between the first and second countours, and adjust the position to be laser-fired by matching the first and second contours; and an emitting controller for generating a laser beam firing signal based on the operating signal in accordance with the laser beam firing specifications in the setting device;

a laser for firing a laser beam to the surface of the structure in accordance with the laser beam firing signal forwarded from the control device;

a scanning device for scanning the laser beam from the laser over the structure, based on the operating signal forwarded from the control device; and a monitoring device for monitoring the removal progress of the coating and generating data related to the removal progress, which are forwarded to the scanning controller, said monitoring device having a color sensor which notes color changes on a surface of the structure before and after being laser-fired so as to determine whether there are any positions remain which require removal.

2. A method for removing a coating existing on the surface of a structure by a laser beam, said method comprising the steps of:

obtaining retrievable coordinate data of positions to be laser-fired on the surface of the structure and laser beam-firing specifications at each coordinate position, said coordinate data including data representative of up-and-down contour of the structure at each coordinate position;

firing a laser beam to the coating existing on the surface of the structure to remove the coating in a target area of a surface of the structure;

monitoring progress of removal of the coating and generating data related to the progress of removal, wherein a change in color on the surface in the target area before and after being laser-fired is monitored:

upon completion of the removal in the target area, moving the laser beam to a next target area having a next coordinate position to be laser-fired on the surface;

monitoring contour of the structure at the next coordinate position to be laser-fired;

retrieving the data representative of the contour at the next coordinate position, and comparing the monitored contour with the retrieved contour;

adjusting the laser beam-firing position to match the monitored contour with the retrieved contour; and controlling the laser beam based on the laser beam-firing signal and the removal progress-related data.

* * * * *